No. 800,577. PATENTED SEPT. 26, 1905.
W. H. HINES.
CRATE OR BOX.
APPLICATION FILED NOV. 14, 1904.
2 SHEETS—SHEET 1.
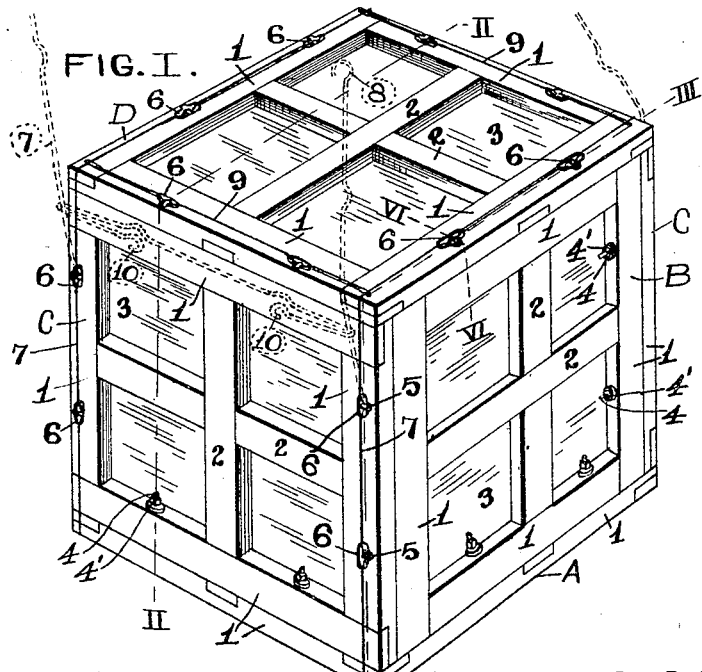
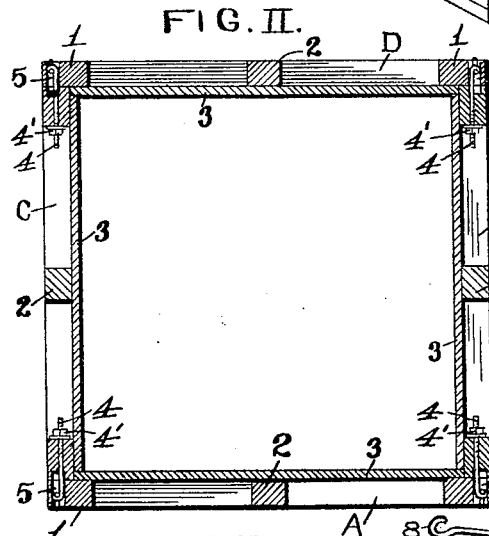
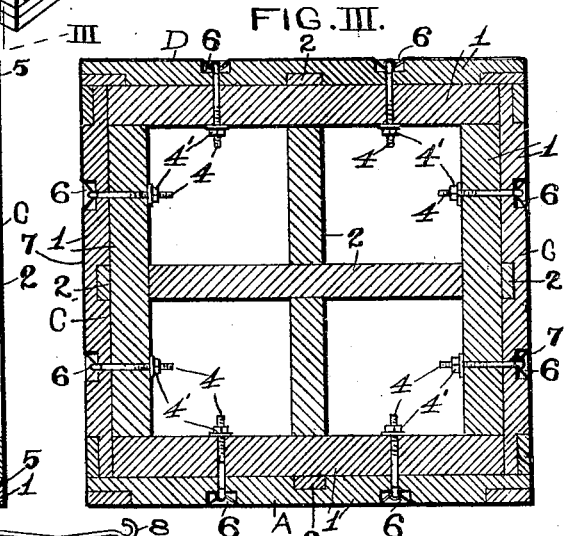
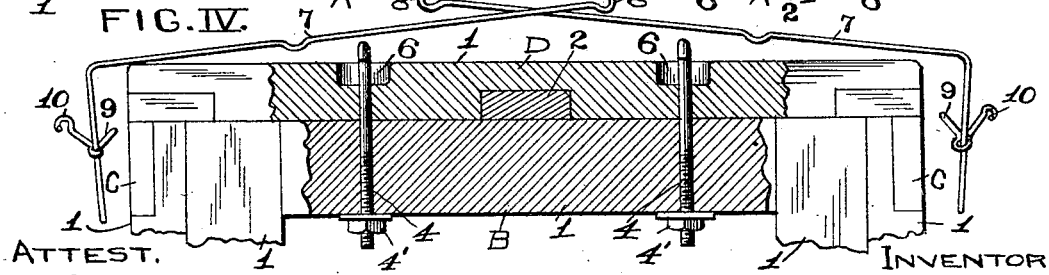
ATTEST.
H. G. Fletcher.
Blanche Hogan.
INVENTOR.
W. H. HINES.
BY Knight Bros.
ATTY'S.

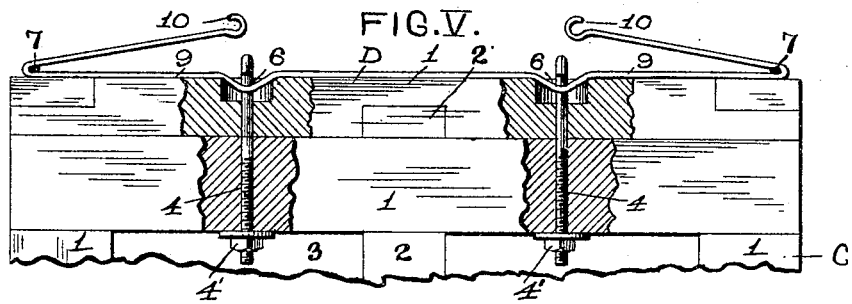
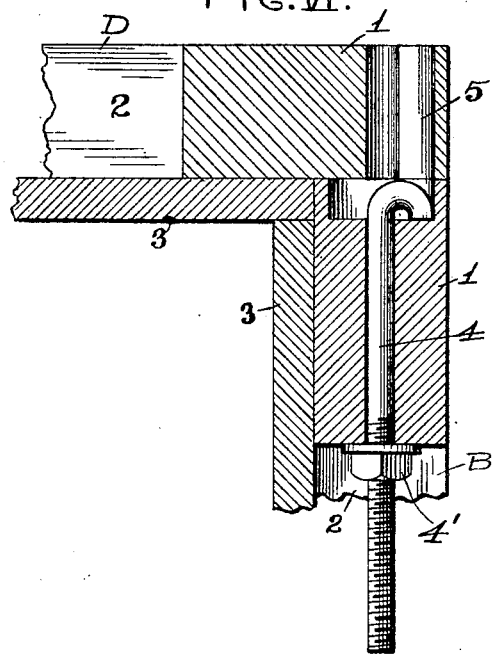
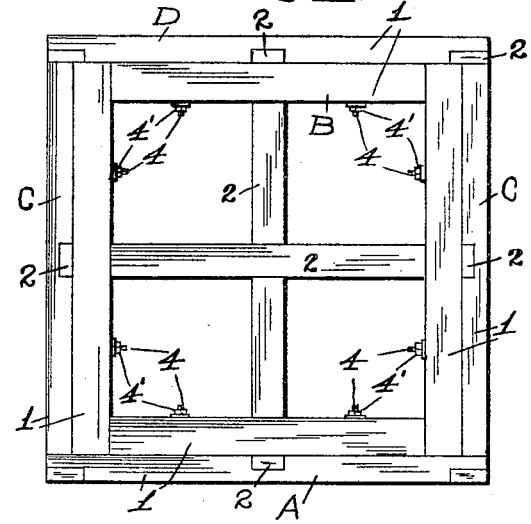
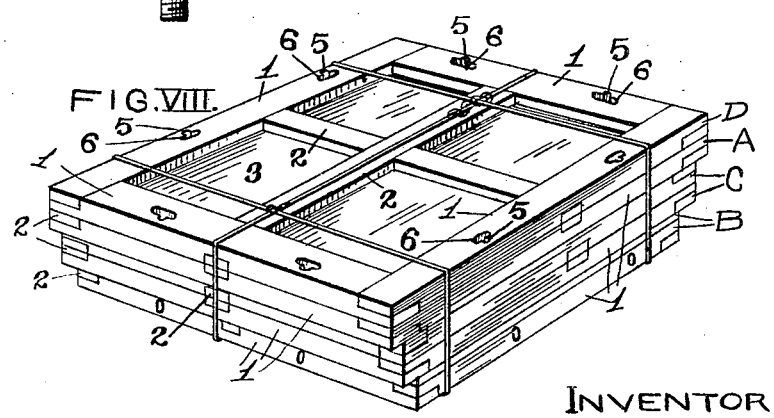

UNITED STATES PATENT OFFICE.

WARREN H. HINES, OF PORT ARTHUR, TEXAS, ASSIGNOR OF ONE-HALF TO JOHN MORIARTY, OF PORT ARTHUR, TEXAS.

CRATE OR BOX.

No. 800,577.      Specification of Letters Patent.      Patented Sept. 26, 1905.

Application filed November 14, 1904. Serial No. 232,705.

*To all whom it may concern:*

Be it known that I, WARREN H. HINES, a citizen of the United States, residing at Port Arthur, in the county of Jefferson and State of Texas, have invented certain new and useful Improvements in Crates or Boxes, of which the following is a full, clear, and exact description, reference being had to the accompanying drawings, forming part of this specification.

My invention relates to a crate or box of "knockdown" form, the invention, briefly stated, consisting of a crate or box made of separable sections and bound together by wires and stay-bolts that are loosely set into the sections.

The object of the invention is to utilize strips of wood or odds and ends of lumber that would otherwise be wasted—such as edgings, pieces of boards, or pieces of veneering—and, further, to utilize as lumber for crate or box construction branches of trees that usually are reduced to fuel.

Figure I is a perspective view of my crate or box. Fig. II is a cross-section taken on line II II, Fig. I. Fig. III is a cross-section taken on line III III, Fig. I. Fig. IV is an enlarged section taken through a portion of the crate or box with one of the binding-wires shown in loosened condition. Fig. V is an enlarged view, partly in elevation and partly in vertical section, of a portion of the crate or box with one of the tie-wires shown in loosened condition. Fig. VI is an enlarged cross-section through one corner of the crate or box, taken on line VI VI, Fig. I, with one of the stay-bolts in receded position. Fig. VII is a side or end elevation of the crate or box. Fig. VIII is a perspective view of the crate or box in a knocked-down condition.

The sections of my crate or box each consists, primarily, of crate-frames, composed of border-strips 1 and crossing-strips 2 located within said border-strips, thereby producing a framework of skeleton form that constitutes the walls—namely, the bottom, sides, ends, and top—of the receptacle. These skeleton frameworks may be assembled in their skeleton form to produce a crate; but where it is desired to utilize the article as a box lining-boards 3 are placed against the inside of the frameworks, as seen in Figs. I, II, and VIII.

For the sake of convenience in description I will designate the bottom section of the crate or box by A, the end sections by B, the side sections by C, and the top section by D.

In assembling my crate or box the side and end sections are mounted on edge on the bottom section A, the end sections being interposed between the side sections, and the top section D rests upon the upper edges of the end and side sections. Extending vertically through the bottom and top sections A and D are bolt-holes that receive hooked stay-bolts 4, equipped with nuts 4', the hook ends of which are adapted to pass through slots or enlargements 5 of said bolt-holes of sufficient dimensions for their passage. The outer ends of the slots 5 terminate in pockets 6, extending longitudinally of the border-strips of the sections. (See Figs. I, III, IV, V, and VIII.) The threaded ends of the stay-bolts 4 pass loosely through the top and bottom border-strips 1 of the end and side sections B and C of the crate or box in which they always remain seated. Stay-bolts 4, similar to those in the top and bottom border-strips of the end sections B, also pass through the upright border-strips of said sections from edge to edge thereof, and their hooked ends are adapted to pass through slots in the upright border-strips of the side sections C in a manner similar to their passage through the bottom and top sections, the said slots terminating in pockets 6, similar to those previously mentioned.

7 designates binding-wires that extend across the bottom section of the crate or box beneath each end section B and in line with the stay-bolts that pass through the lower strips of said end sections. From the bottom section these binding-wires extend upwardly in line with the stay-bolts that pass through the upright border-strips of the end sections and the upright border-strips of the side sections C. The upper ends of the binding-wires 7 are then bent across the top section D in line with the bolts in the upper border-strip 1 of the end sections, the terminals of the wires being provided with eyes 8.

9 designates tie-wires that are located at the top and bottom of the crate or box and which are looped around the binding-wires 7, their ends being returned from said binding-wires and provided with eyes 10, that are so located as to occupy positions corresponding to the locations of the stay-bolts that pass through the top and bottom border-strips of the side sections C and pass through the slots in the side border-strips of the bottom section A and top section D.

When the crate or box is originally assembled, the stay-bolts 4 throughout the series of end and side sections B and C are first introduced into said sections, the nuts thereon being sufficiently receded to permit of the passage of the hook ends of the bolts through the slots in the sections adjacent thereto. The binding-wires 7 and tie-wires 9 are then applied to the stay-bolts, and the nuts of said bolts are tightened to draw the wires into the pockets 6, in which the hooked ends of the bolts are present, the terminals of the binding-wires being held by the attachment of their eyes to the hooks or stay-bolts, to which they are passed previous to such stay-bolts being tightened. When the crate or box is to be opened, the nuts of the stay-bolts that confine the binding-wires 7 are loosened to a sufficient degree to permit of the hooks of said bolts being projected outwardly from the pockets 6 that they occupy, after which the end portions of the binding-wires may be readily detached from the bolt-hooks, as seen in Fig. IV, and bent outwardly into the positions seen in dotted lines, Fig. I. The nuts of the stay-bolts that confine the tie-wires 9 at the top of the crate or box are likewise loosened to permit of their hook ends being protruded for disconnection of the tie-wires therefrom, as seen in Fig. V, after which the tie-wires may be readily slipped off the top section D and downwardly on the binding-wires 7, as seen in Fig. I, thereby releasing the top section, so that it may be removed to gain access to the crate or box.

It will be understood that the box or crate may be readily rendered suitable for holding liquids or semiliquid substances by placing a suitable lining therein.

The crate or box may be readily shipped in knocked-down condition when the various sections thereof are disassembed and the stay-bolts are drawn inwardly in the various sections in which they are seated and their nuts are tightened, the wires to be used for binding the sections together when set up being utilized to bind the disassembled sections into a bundle, as seen in Fig. VIII.

I claim as my invention—

1. A receptacle of the character described, consisting of a plurality of sections provided with bolt-holes, open-hook stay-bolts in a part of said sections adapted to pass through bolt-holes in other of the sections adjacent thereto, and binding-wires passing around said sections and adapted to be detachably engaged by the hooks of said stay-bolts, substantially as set forth.

2. A receptacle of the character described, consisting of a plurality of sections provided with bolt-holes, open-hook stay-bolts in a part of said sections adapted to pass through bolt-holes in other of the sections adjacent thereto, and binding-wires passing around said sections and adapted to be detachably engaged by the hooks of said stay-bolts; said sections being provided with pockets at the bolt-holes therein to receive the hooks of said stay-bolts and the wires fitted thereto, substantially as set forth.

3. A receptacle of the character described, consisting of a plurality of sections provided with bolt-holes, open-hook stay-bolts in a part of said sections adapted to pass through bolt-holes in other of the sections adjacent thereto, binding-wires passing around said sections and adapted to be detachably engaged by the hooks of said stay-bolts, and tie-wires connecting said binding-wires and adapted to be detachably engaged by the hooks of said stay-bolts, substantially as set forth.

4. A receptacle of the character described, consisting of a plurality of sections provided with bolt-holes, open-hook stay-bolts in a part of said sections adapted to pass through bolt-holes in other of the sections adjacent thereto, binding-wires passing around said sections and adapted to be detachably engaged by the hooks of said stay-bolts; said binding-wires being provided with eyes at their terminations, substantially as set forth.

5. A receptacle of the character described consisting of a plurality of sections provided with bolt-holes, open-hook stay-bolts in a part of said sections adapted to pass through bolt-holes in other of the sections adjacent thereto, binding-wires passing around said sections and adapted to be detachably engaged by the hooks of said stay-bolts, and tie-wires connecting said binding-wires and adapted to be detachably engaged by the hooks of said stay-bolts; said binding-wires and tie-wires being provided with eyes at their terminations, substantially as set forth.

WARREN H. HINES.

In presence of—
ARKER P. BETTERTON,
JOHN MORIARTY,
A. M. RUTAN.